United States Patent [19]

Honey

[11] Patent Number: 4,626,063
[45] Date of Patent: Dec. 2, 1986

[54] CONTROL OF ROTATING MIRRORS

[76] Inventor: Frank R. Honey, 149 Coode Street, Bayswater, Western Australia 6053, Australia

[21] Appl. No.: 686,265
[22] PCT Filed: Apr. 12, 1984
[86] PCT No.: PCT/AU84/00057
  § 371 Date: Dec. 12, 1984
  § 102(e) Date: Dec. 12, 1984
[87] PCT Pub. No.: WO84/04175
  PCT Pub. Date: Oct. 25, 1984

[30] Foreign Application Priority Data

Apr. 15, 1983 [AU] Australia ............... PF8895

[51] Int. Cl.[4] .................. G02B 7/18; G02B 26/10
[52] U.S. Cl. ................. 350/6.9; 350/500; 250/235
[58] Field of Search .......... 350/6.9, 6.5, 500, 632, 350/636, 486, DIG. 3; 354/95; 250/235, 236

[56] References Cited

U.S. PATENT DOCUMENTS 3,580,150  5/1971  Watson ............... 354/95

FOREIGN PATENT DOCUMENTS 134325  10/1981  Japan ............... 350/6.5

OTHER PUBLICATIONS

A. A. Babayev, "Gyro-Optical Azimuthal Instrument", *Soviet Jour. of Optical Tech.*, vol. 35, No. 5, Sep.-Oct., 1968, pp. 636–639.

A. C. O. Gibb et al, "A Line of Sight . . . ", Jour. of Electrical & Electronics Eng., Australia, vol. 1, No. 1, Mar. 1981.

*Primary Examiner*—Jon W. Henry
*Attorney, Agent, or Firm*—Sughrue, Mion, Zinn, Macpeak, and Seas

[57] ABSTRACT

When producing images of the earth using rotating planar mirrors mounted in an aircraft, errors are introduced by roll, pitch and yaw of the aircraft. These errors are overcome in one of two ways. In the first way, the scanning planar mirror (30) is mounted on a shaft (54), the axis of which can be moved through small angles during the rotation of the shaft. This movement of the shaft is achieved by supporting the shaft (54) so that the end which does not carry the mirror is located within a cylindrical hollow region (60) at the end of an outer shaft (50). The two shafts rotate together. A pair of permanent magnets (51,52), each mounted axially in a respective shaft, have opposite poles adjacent to each other. The attraction of the magnets is perturbed by a transverse magnetic field established by an electromagnet (57,58,59) mounted outside the outer shaft (50). The current in the winding of the electromagnet depends upon the value of signals which are proportional to pitch and yaw of the aircraft. Those signals are derived from a gyroscope system (70). The second mechanism for overcoming errors involves mounting the scanning, planar mirror (12) in a cylinder (10) which is part of an inertial system that, in turn, is mounted on gimbals. Radiation received by the mirror is reflected by a system of mirrors which is similar to a Cassegrain telescope. The radiation is finally reflected by an elliptical mirror (18) to radiation monitoring equipment (21). In each case, signals indicative of the roll of the aircraft are used to control the time at which samples of the incoming radiation are first monitored.

13 Claims, 8 Drawing Figures

CONTROL OF ROTATING MIRRORS

TECHNICAL FIELD

This invention concerns the control of rotating mirrors, such as those used to produce images of regions of land, or to derive information about such regions of land, by sequentially scanning strips of land from an aircraft. It is especially concerned with the decoupling between a rotating mirror and a fixed, associated telescope or other information receiving apparatus.

The present invention was developed primarily for use in an airborne multi-band spectral analyser (of the type used, for example, for thermal imaging), but the invention may be used for other purposes—such as in photographic surveys. In view of the history of its development, the application of the invention to multi-band spectral analysis will be given particular reference in the following description.

BACKGROUND ART

With the establishment of satellites—such as the LANDSAT satellite—there has been an increased recognition of the value of making observations of the earth's surface using equipment which employs thermal imaging techniques. Already, thermal imaging has been proposed for water pollution studies, forest fire detection and damage assessment, location of underground springs, obtaining an inventory of forest, mountain and agricultural lands, monitoring the ripening of wheat and other crops, and observing fishery and tidal movements. More recently, it has been appreciated that further information can be obtained using multi-band spectral analysis (that is, the technique of simultaneously observing an object in several regions of the electromagnetic spectrum), especially if that analysis can be performed on images obtained from low-level aircraft observations.

It is well known that low-flying aircraft often experience substantial turbulence. Consequently, if observations are to be made from low-flying aircraft (especially from light aircraft) using a scanning arrangement such as a rotating mirror, and maximum information is to be obtained from those observations, then perturbations of the scanning process due to roll, pitch and yaw of the aircraft must be compensated.

When making observations from a large aircraft, the effects of roll, pitch and yaw have been eliminated or substantially reduced by mounting the equipment carried in the aircraft on a stabilised platform. However, the use of a stabilised platform in a light aircraft imposes a substantial weight burden and also (because it is necessary to maintain stabilising gyroscopes in action) a substantial power burden.

DISCLOSURE OF THE PRESENT INVENTION

It is an object of the present invention to provide an arrangement for mounting a scanning mirror in an aircraft with a telescope and/or associated analysis equipment, which is responsive to variations in the aircraft's flight to provide compensation for roll, pitch and yaw perturbations of the aircraft's straight and level flight, without the power usage and weight penalties of a stabilised platform.

This objective is achieved by using (a) a novel optical decoupling between the rotating (scanning) mirror and the telescope and/or associated analysis equipment, and (b) stabilisation of the scanning mirror.

According to a first—and preferred—aspect of the present invention, the decoupling is achieved using a "nodding" motion of the rotating mirror, to which an inertial system has been coupled to compensate for pitch and yaw of an aircraft.

According to a second aspect of the present invention, the decoupling is obtained using an elliptical mirror arrangement, and the pitch and yaw stabilisation is provided by coupling an inertial system to a rotating mirror which is mounted on gimbals.

In each case, compensation for roll of an aircraft is achieved by varying the time at which the sampling commences during rotation of the scanning mirror.

In the case of the "nodding" mirror arrangement, the present invention provides for the mounting of the rotating or scanning mirror on a shaft which can move within a hollow region of an outer, larger shaft. The precise location of the inner shaft is controlled by a combination of permanent magnets and electromagnets. In a preferred form of this arrangement, the inner shaft is held in position by a ball-joint structure and the inner shaft is pivotally moved about the ball-joint by applying transverse forces to a permanent magnet which is axially mounted in the inner shaft, using a quadrapole electromagnet.

More specifically, according to the first form of the present invention, a rotating mirror arrangement for use in airborne scanning comprises:

(a) a first shaft of circular cross-section, adapted to rotate about its axis, and shaft being hollow at one end thereof to provide a cylindrical region of circular cross-section within said shaft;

(b) a second shaft, which is longer than the cylindrical region of the first shaft, said second shaft being supported within the cylindrical region of the first shaft by pivot means at or near the open end of said cylindrical region, said second shaft being pivotable about the axis of said pivot means, said axis being orthogonal to and passing through the axis of said first shaft, said second shaft being a loose fit in said cylindrical region;

(c) a planar mirror mounted on the end of said second shaft which is outside said cylindrical region, the plane of said mirror being at 45° relative to the axis of said second shaft;

(d) a first elongate permanent magnet mounted within said first shaft along the axis thereof, a pole of said first permanent magnet being adjacent to the closed end of said hollow cylindrical region;

(e) a second elongate permanent magnet mounted within said second shaft along the axis thereof, a pole of said second permanent magnet being adjacent to the end of said second shaft which is remote from said planar mirror, so that said second permanent magnet is attracted by said first permanent magnet, to bias the second shaft to a central position within the cylindrical region; and (f) electromagnet means fixedly positioned external to said first shaft, to generate a magnetic field in the region of said second permanent magnet;

whereby, when a magnetic field is established by said electromagnet means, the bias on said second permanent magnet comprises the net effect of said magnetic field and the magnetic field established by said pole of said first permanent magnet.

With such an arrangement, the bias that is established when a current flows through the windings of the electromagnet to create a magnetic field at right angles to the pivot axis, causes the second shaft to rotate about the pivot axis. The maximum rotational movement of the second (or inner) shaft occurs when the second shaft meets the inside wall of the cylindrical region of the first shaft.

The electromagnet means may be either a monopole or dipole electromagnet. However, if the pivot means is replaced with a ball joint bearing or the like, so that the plane of the mirror can be moved relative to the axis of the second (inner) shaft in any direction, a quadrapole electromagnet may be used to control the position of the mirror relative to the axis of the first shaft.

In practice, this form of the present invention will include appropriate support bearings for the first shaft, and means to cause the first shaft to rotate about its axis within those bearings. For balancing, especially if high speed rotation of the first shaft is contemplated, a ring will normally be mounted on the second shaft in the same position as the planar mirror, but with the plane of the ring at right angles to the plane of the mirror. Weights may then be fitted to the ring, if necessary, to provide static and dynamic balance of the assembly.

When using this aspect of the present invention is used in an aircraft, a gyroscope system is used to generate control signals for the rotating mirror assembly. The magnitude of each control signal is proportional to, respectively, the roll, pitch and yaw of the aircraft. The pitch and yaw signals are used to generate currents in the windings of the electromagnet to vary the axis of scan of the mirror, while the roll control signal is fed to a microprocessor, which is programmed to control the time at which data sampling starts.

According to the second aspect of the present invention, an arrangement for mounting a planar mirror for use in airborne scanning comprises:
(a) a first hollow cylinder of annular cross-section, said mirror being mounted in the vicinity of one end thereof with the plane of the mirror at substantially 45° relative to the axis of the cylinder, a reflecting concave mirror with an aperture in the centre thereof being mounted transversely at the other end of the cylinder;
(b) a second hollow cylinder of annular cross-section, closely surrounding said first cylinder and extending from said one end of said first cylinder to beyond said other end of said first cylinder, said second cylinder being mounted on gimbals;
(c) a cylindrical mass of annular or circular cross-section connected to said first cylinder with its axis co-linear with the axis of said first cylinder, said mass being located within the extension of said second cylinder beyond said other end of the first cylinder;
(d) means to cause said first cylinder and said mass to rotate within said second cylinder about said axis;
(e) a first aperture in the lower part of the second cylinder in the vicinity of the planar mirror;
(f) a second aperture in said first cylinder adjacent to the planar mirror to permit radiation which passes through said first and second apertures when said apertures overlap to strike said planar mirror and to be reflected by said planar mirror to said concave mirror;
(g) a circular convex mirror having a diameter substantially smaller than the internal diameter of said first cylinder, mounted within said first cylinder on the axis thereof and adapted to receive radiation reflected from said concave mirror and reflect that radiation through the aperture in said concave mirror;
(h) a relatively small planar mirror located on the axis of the first and second cylinders, between said first cylinder and said mass, at an angle of 45° relative to said axis, and adapted to receive the radiation reflected from said convex mirror, said relatively small planar mirror being positioned at the pivot point of the gimbals; and
(i) an elliptical mirror located in a fixed position outside said second cylinder and adapted to receive radiation reflected by said small planar mirror, said elliptical mirror being so located that the small planar mirror is positioned at one of the conjugate foci of the elliptical mirror;
whereby radiation incident on said first planar mirror through said first and second apertures is reflected, in turn, by the concave mirror, the convex mirror and the relatively small planar mirror on to said elliptical mirror.

Those with a knowledge of optics will recognise that this arrangement of concave and convex mirrors constitutes a Cassegrain telescope construction.

In practice, when this arrangement is to be used for multi-band spectral analysis, means to selectively disperse radiation which is incident on the elliptical mirror will be located at the other conjugate focus of the elliptical mirror. In other applications, other radiation monitoring means—such as a photographic film in a camera—may be located at that other conjugate focus of the elliptical mirror.

These and other aspects of the present invention will now be described in more detail with reference to the accompanying drawings.

DETAILED DESCRIPTION OF THE ILLUSTRATED EMBODIMENTS OF FIGS. 1 TO 7

Figure 1:
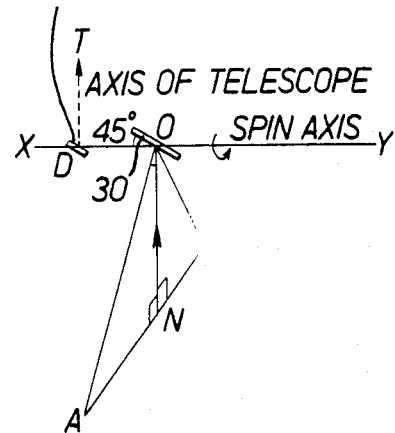
FIGS. 1, 2, 3 and 4 are diagrams which will be used to explain the way in which a "nodding" action of the scanning mirror of an airborne scanning device is effective to compensate for pitch and yaw in an aircraft.

The diagram of FIG. 1 illustrates the situation where an aircraft carrying ground scanning equipment is flying in an undisturbed manner, along a reference axis OX, with the scanning mirror 30 at 45° to this axis, so that radiation from directly below the aircraft is reflected into the telescope optics of the scanning equipment along the telescope axis DT. The spin axis of the scan mirror 30 lies along the axis OY, which is co-linear with the reference axis OX when the aircraft is flying straight and level and there is no pitch or yaw of the aircraft. N is the nadir point (the point on the earth's surface which is directly below the aircraft). As the scan mirror 30 rotates, it sweeps out a line ANB on the surface of the earth. It should be noted that no correction has been allowed for the sigmoid shape of the scan line on the surfce, arising from the combination of a constant forward motion of the aircraft with the varying rate of movement of the scanned spot across the surface when the scan mirror rotates at a constant angular rate.

Figure 2:
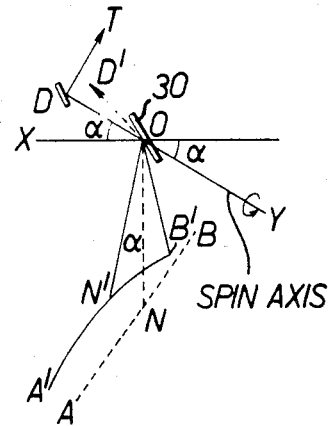

Referring now to FIG. 2, it will be seen that when the aircraft pitches through an angle alpha, if the spin axis of the scan mirror 30 moves with the aircraft axis, the direction of the ray of radiation from the nadir point N is then along the path N-O-D', where line O-D' is at an angle alpha to the line O-D along which radiation must pass to enter the telescope. Tracing the path D-O back, reflecting it from the scan mirror, it may be seen that radiation from point N' is entering the telescope in the required direction. Also, by studying the effect of now sweeping a cone across the surface because of the tilted scan mirror, the line swept out by the scan mirror 30 is a conic section represented by the arc A'-N'-B'.

Figure 3:
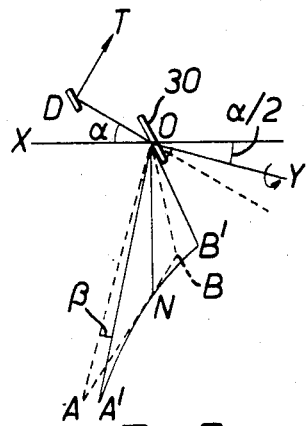

FIG. 3 illustrates the result of tilting the scan mirror 30 back by an angle (alpha/2) to bring the two points N' and N into coincidence. The scan mirror then deflects radiation from the nadir point N along the axis O-D and into the telescope optics. However, since the scan mirror axis is still tilted at an angle (alpha/2) to the reference axis O-X, rotation of the mirror 30 results in a cone being swept out, and the intersection of this cone with the surface is now the arc A'-N-B'. The angle of error A-O-A' is beta and it will be seen from a study of FIG. 3 that the magnitude of the angle beta is a function of the angle from nadir of the scan and of the pitch angle alpha, and the sign of beta is opposite to that of alpha.

Figure 4:
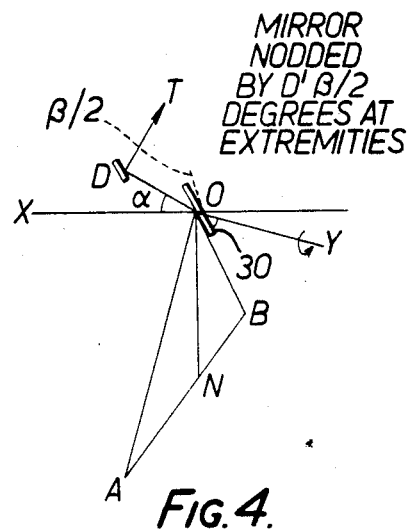

In order to bring the points A' and B' of FIG. 3 into coincidence with the points A and B, and hence scan a straight line on the surface (which is the situation when the aircraft is in an undisturbed state as shown in FIG. 1), it is necessary to tilt the scan mirror 30 through an angle (beta/2) as the mirror scans, remembering that the angle beta is a function of the scan angle, and is zero at nadir. This configuration is illustrated in FIG. 4.

Thus it will be seen that, to provide the required correction when the aircraft pitches, it is necessary for the mirror 30 to have a nodding motion during the scan.

Similar reasoning may be applied when there is yaw of the aircraft.

For a pitch angle of 10°, for which a tilt in the spin axis of the scanning mirror of 5° is required for the primary correction, a nodding correction of 0.8° is necessary at plus and minus 45° from nadir.

Having realised the problem and what is necessary to overcome it, several schemes for providing a nodding mirror were studied by the present inventor, including (a) a mechanical system using a cam follower and a system of levers to control the mirror angle, (b) a system using a single lever moved by a linear voice coil, and (c) a system using piezo-electric materials to deflect the mirror. Each of these systems had severe limitations and was discarded. Eventually, the arrangement which constitutes the first aspect of the present invention was conceived by the present inventor. One embodiment of this arrangement is illustrated in FIG. 5.

Figure 5:
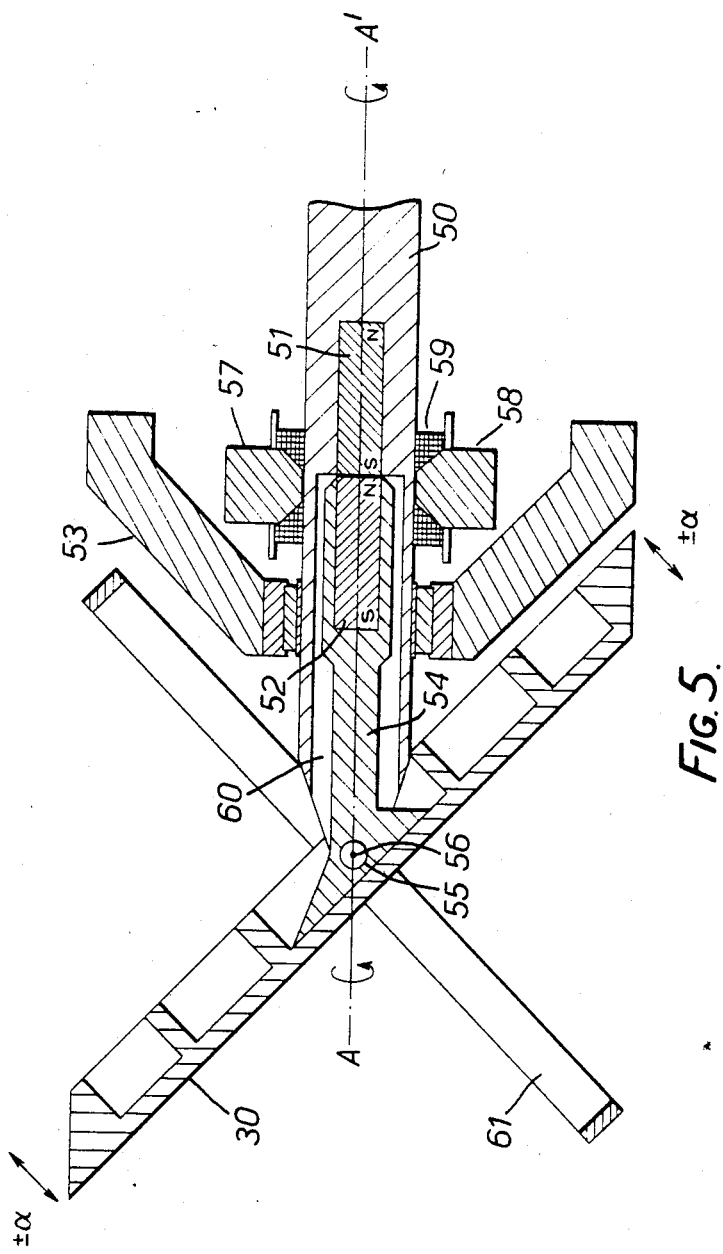
FIG. 5 is a sectional view of one form of the first aspect of the present invention.

In FIG. 5, a scan mirror 30 spins with a first or outer shaft 50, on a spin axis which is indicated in FIG. 5 as axis A—A'. The bearing and end support for shaft 50 is conventional engineering, and is shown by reference 53.

The mirror 30 is indirectly connected to shaft 50, as will be seen from the following description of the device illustrated in FIG. 5.

The first or outer rotatable shaft 50 is hollow at one end to provide a cylindrical region 60. Inserted into shaft 50 and located at the innermost end of the hollow region 60, and rigidly attached to the shaft 50 along its axis, is a first elongate permanent magnet 51.

Also inserted into the hollow end of shaft 50 is the second or inner shaft 54, which is attached to shaft 50 by a pivot pin 55. The axis of pivot pin 55 is indicated by reference numeral 56. Because there is a clearance between the outer surface of the second (inner) shaft 54 and the inside surface of the hollow region at the end of the outer shaft 50, the shaft 54 can move within the hollow region 60 when it is moved about the pivot axis 56. The clearance between the shaft 54 and the inside surface of shaft 50 which defines the hollow region 60 is such that the axis of shaft 54 can move across A—A' by plus or minus approximately 3°.

Inserted into the end of inner shaft 54 which is remote from pivot 55 (that is, at the end of shaft 54 that is nearest to the magnet 51) and firmly positioned along the axis of the inner shaft, is a second elongate permanent magnet 52. The magnets 51 and 52 are arranged so that their opposite poles are adjacent and the magnets are separated by a gap of approximately 0.25 millimetres. Due to the attraction of the opposite poles of the two magnets 51 and 52, the axis of shaft 54 is held firmly aligned with the axis A—A', provided no large external force is applied to shaft 54 or to the magnets 51 and 52.

The scan mirror 30 is rigidly attached to the end of shaft 54 which protrudes from the cylindrical region of shaft 50, and at 45° to the axis of shaft 54.

An electromagnet with poles 57 and 58, and windings 59, is positioned with the poles close to shaft 50, and diametrically opposite each other. The poles 57 and 58 are located adjacent to shaft 50 near to the gap between the two internal permanent magnets 51 and 52. When current is passed through the coil 59 of the electromagnet, the magnetic field established by the electromagnet causes the permanent magnet 52 to be attracted towards the appropriate pole of the electromagnet. If the axis 56 of the pivot 55 is not parallel to the direction between the poles 57 and 58 of the electromagnet, this attraction will cause the partial rotation of shaft 54 about the pivot axis 56, and hence the tilting of mirror 30. The magnitude of the movement of shaft 54 is determined by the strength of the field that is established by the electromagnet (which is determined by the current through the coil 59) and by the attractive force between the magnets 51 and 52. As shaft 50 rotates about the spin axis A—A', when the axis 56 of the fulcrum for shaft 54 and mirror 30 is perpendicular to the line between poles 57 and 58 of the electromagnet, shaft 54 is given its maximum offset, and when axis 56 of the fulcrum is parallel to the line between the poles 57 and 58, shaft 54 will have zero offset because it is attracted back to its centred orientation by the force between magnets 51 and 52.

It will be appreciated that as shaft 50 does a complete rotation, if a direct current is applied through the coil 59 of the electromagnet, then the shaft 54 and mirror 30 will go through two deflecting oscillations. It is possible, but not necessary, to reverse the polarity of the field due to the electromagnet by passing an alternating current which has the same period as the period of revolution of shaft 50 through the coil 59. It should be noted that the electromagnet does not rotate with shaft 50.

It is necessary for the combined mass of mirror 30, shaft 54 and magnet 52 to be reasonably balanced about axis 56. When there is a high rate of rotation of shaft 50 (and hence a high rate of rotation of the masses of the mirror 30, shaft 54 and magnet 52), the balance of the combined components must be more precise. When the shaft 54, magnet 52 and mirror 30 are rotating, there will be a small turning moment about the axis 56 (that is, the spinning mirror system, although statically balanced as described above, will not be dynamically balanced when it is spinning). Dynamic balancing is achieved by fixing a ring 61 at right angles to the mirror 30, and attaching weights to it to provide static and dynamic balance. Because the balancing is achieved with a ring 61, there is no interruption to the optical path from the target to the telescope during the relevant part of the scanning operation.

Figure 6:
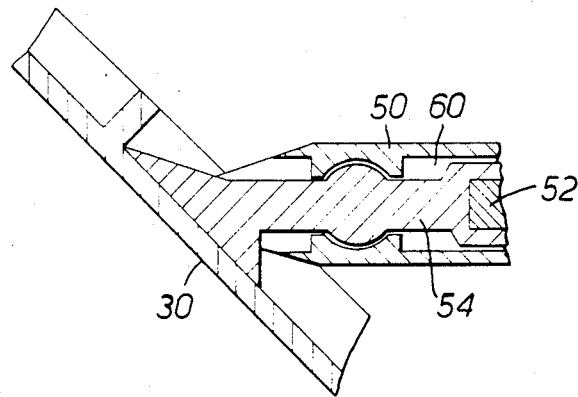
FIG. 6 illustrates an alternative mounting arrangement for the "second shaft" of the embodiment illustrated in FIG. 5.

A modification of the arrangement illustrated in FIG. 5 is to substitute a ball joint for the pivot pin 55, and to change the dipole electromagnet for a quadrapole electromagnet. One form of ball joint that may be used is depicted in FIG. 6, where similar components to those of the embodiment of FIG. 6 have been given the same reference numerals. With this modification, the mirror 30 can be "steered" by shaping the magnetic field established by the quadrapole electromagnet. Shaping the magnetic field is effected by varying the current through each of the four coils of the quadrapole magnet.

Figure 7:
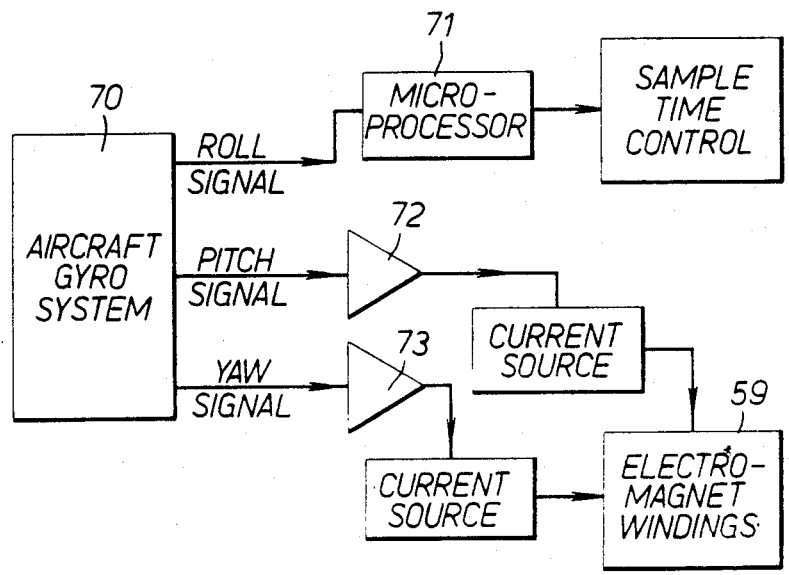
FIG. 7 is a block diagram showing how the apparatus illustrated in FIG. 5, or a modified form of that apparatus, is used in an aircraft.

When a "nodding mirror" arrangement is used in an aircraft, a gyroscope system in the aircraft is used to provide separate signals which are indicative of the roll, pitch and yaw that is experienced by the aircraft. As shown in FIG. 7, the roll-indicating signals from the gyroscope system 70 are fed to a microprocessor 71 which is programmed to vary the time of initiation of the data sampling, to compensate for the roll of the aircraft. The signals (usually voltages) which indicate the changes in pitch and yaw are amplified by, respectively, the amplifiers 72 and 73. The amplified signals are used to control the current which passes through the windings 59 of the electromagnet to generate the magnetic field that will tilt the scan axis of the mirror relative to the reference axis OX of FIG. 1. To provide the correct compensation, the maximum tilt of the scan axis will be half the value of the pitch and yaw.

When the aircraft undergoes a pitching motion, the voltage signal from the gyroscope system which provides the measure of the pitch variation will ensure that as the scan mirror rotates, the scan axis oscillates through an angle which is proportional to the angular variation in pitch. The effect of yaw on the variation of the scan line as swept out on the earth's surface is similar to the effect of pitch, but not identical to the effect of pitch. Whereas the pitch effect is symmetric about the nadir point on the surface, the effect of yaw is assymetric (that is, it will be additive to the effect of pitch one side of the nadir point, and subtractive on the other side). It will, however, still be a conic section on the surface, and can be represented, to a fair degree of precision, by a periodic function. The cumulative effect of both pitch and yaw can also be represented by a periodic function such as a three or four term Fourier sum, and can be corrected using a single electromagnet, passing an alternating current through the coil 59, the magnitude and phase of the current being determined as a fourier sum by treating pitch and yaw as orthogonal.

With a quadrapole electromagnet, the operation of the equipment is similar.

Whether a dipole or quadrapole electromagnet is used, effective decoupling of optical data into a fixed telescope system is achieved, with good correction for pitch, yaw and roll perturbations of the aircraft's flight, using this first aspect of the present invention.

DETAILED DESCRIPTION OF THE EMBODIMENT OF FIG. 8

Figure 8:
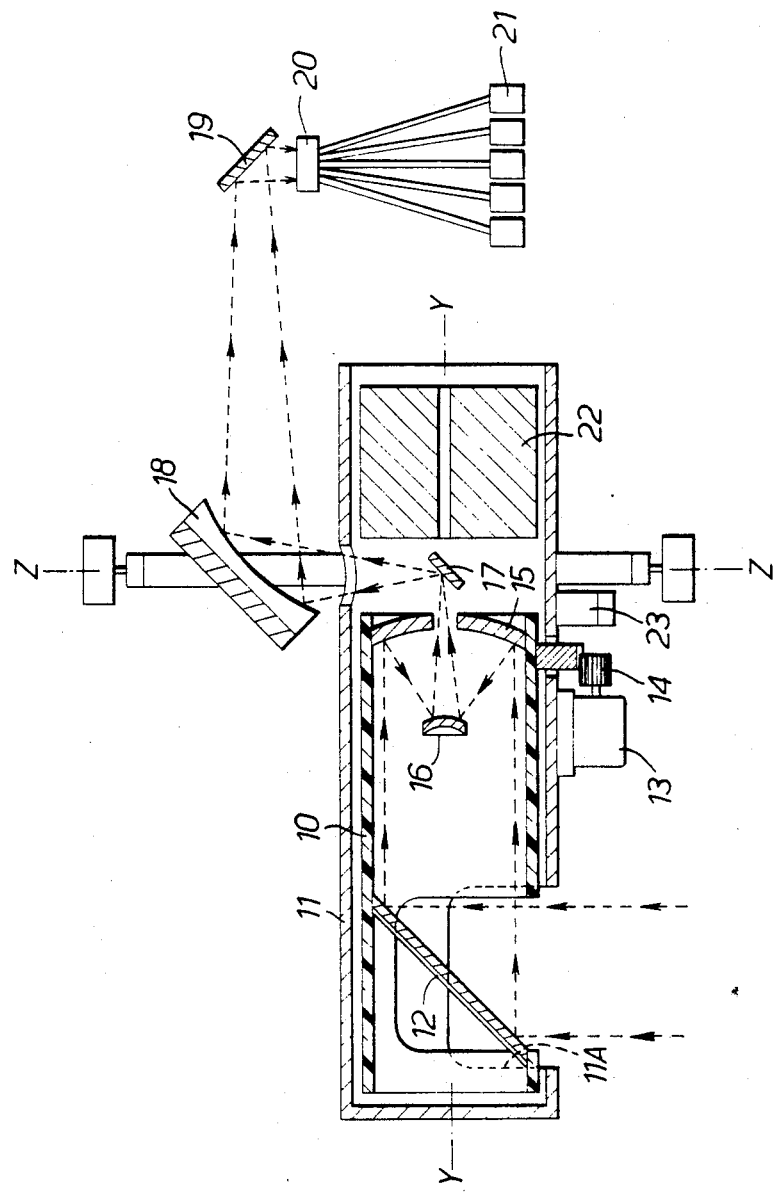
FIG. 8 is a diagram, partly schematic, of an embodiment of the second aspect of the present invention.

An airborne scanner for use in a multi-band spectral analysis survey, constructed in accordance with the second aspect of the present invention, is illustrated in FIG. 8. This instrument was designed to provide information about the radiation from an area of land of 25 square meters (called the target), using an aircraft flying at an altitude of 1,000 meters above the terrain. Thus the scanning mirror had an instantaneous field of view of 5 milliradians. The minimum survey parameters that were chosen for use of this aspect of the present invention were: aircraft speed of 50 meters per second; angle of scan of 45° each side of nadir (as noted above the nadir point is a point directly below the aircraft).

In FIG. 8, the path of radiation emitted from the target is indicated by the dashed lines to which an occasional arrowhead has been added (to indicate the direction of the path of the radiation).

The device illustrated in FIG. 8 comprises two concentric, hollow cylinders 10 and 11. The inner cylinder 10 rotates on bearings inside the outer cylinder 11. The outer cylinder 11 is fixed with respect to the roll axis of the aircraft, but it is free to pivot on a gimbal system about the aircraft pitch and yaw axes (X and Z axes, respectively). The rotating inner cylinder 10 is driven by a constant speed motor 13 and gear 14, which are mounted on the outer cylinder 11.

Attached to the inner rotating cylinder 10 is a front surfaced planar mirror 12 which is at 45° to the axis of rotation (Y—Y) of the rotating cylinder 10.

An aperture in the wall of the inner cylinder 10 adjacent to the mirror 12 permits radiation from outside the cylinder 10 to strike the mirror 12. An aperture 11A in the lower half of the outer cylinder 11 permits radiation from below cylinder 11 to be incident upon the inner cylinder 10. A collimating arrangement (not shown in FIG. 8) usually ensures that only radiation from a predetermined region below cylinder 11 can enter aperture 11A. When the aperture in the inner cylinder 10 and the aperture 11A overlap, radiation from the predetermined region is incident upon the mirror 12.

The mirror 12 directs the incident radiation from the predetermined region into a Cassegrain telescope consisting of front surfaced mirrors 15 (concave) and 16 (convex). The radiation reflected from the convex mirror 16 is then directed on to the front surfaced small planar mirror 17, which is fixed at 45° to the axis of rotation of the system, at the pivot point of the gimbal system (that is, at the intersection of axes Y—Y and Z—Z). The small planar mirror 17 is at one of the conjugate foci of an elliptical front surfaced mirror 18. (One of the properties of elliptical mirrors is that radiation reflected from one of its foci always passes through the other focus.)

The radiation from the mirror 17 is reflected from the surface of the elliptical mirror 18 on to a front surfaced mirror 19, which is supported at 45° to the direction of radiation from mirror 18. The mirror 19 reflects the radiation on to a cluster of light pipes 20, through which the radiation is directed on to detector/filter sets 21. Mirror 19 and the light pipes 20 are positioned before the second focus of the elliptical mirror.

Instead of the combination of mirror 19 and light pipes 20, a multi-faceted mirror could be used to direct the radiation from mirror 18 on to the detectors 21.

To increase the inertia of the rotating cylinder 10, a relatively large cylindrical mass 22 is also mounted within cylinder 11, to rotate about the axis Y—Y with cylinder 10.

The combination of the inertially stabilised scanning mirror system and the fixed elliptical mirror 18 enables decoupling of the scanner system from the aircraft pitch and yaw motions, and allows the detector system to move with the roll, pitch and yaw motions. That is, both the scanner axis and its path on the ground move in a direction parallel to the axis of rotation of the inertial mass comprising cylinder 10 and weight 22.

Although the inertial reference mass and the gimbal mount through axes Y—Y and Z—Z provide isolation from the aircraft pitch and yaw, they do not measure or compensate for roll of the system with the aircraft. To allow for the effects of the roll motion of the aircraft, a second inertial reference 23, normal to the direction of the axis of rotation Y—Y, is combined with an optical shaft encoder. The inertial reference 23 provides a measure of the magnitude and direction of rotation of the reference system about the roll axis Y—Y. The optical shaft encoder (not shown), which is attached to the inner rotating cylinder 10, monitors the angular position of the scanner mirror 12 with respect to the inertial reference about the roll axis. If the scanner mirror 12 is assumed to be rotating in a clockwise direction when looking in the direction of the aircraft travel, and if the roll attitude reference system measures roll in the clockwise direction, then a microprocessor supplied with signals from the inertial reference will ensure that the sampling of radiometric data for the required number of sample intervals begins early. Similarly, if the roll attitude reference signal indicates that a counter-clockwise roll of the aircraft has occurred, the microprocessor will ensure that the sampling commences later.

Reference targets for internal calibration of some of the channels of the scanner system are inserted in the outer, non-rotating cylinder 11, so that they are in the field of view of the telescope when the scan mirror is looking at the top of the outer cylinder (that is, when radiometric data from the target is not being sampled).

Two alternative means of driving the inertial mass comprising cylinder 10 and weight 22 may be used. The first alternative is an electrically powered system, with the inertial mass (or at least the mass 22) comprising the armature of an electric motor. However, in some aircraft, this arrangement may cause a current drain which is too high for a system using batteries. The second proposed alternative is the use of jets of compressed nitrogen, directed through nozzles on to slots or vanes around the circumference of the mass 22.

The apparatus illustrated in FIG. 8 performs a primary correction for pitch, yaw and roll. This correction removes most of the errors that result from such movements of the aircraft, and this is adequate for many sampling situations. However, there is a significant residual error which is not corrected by this apparatus, namely the residual error that is due to the conic section that is swept out on the surface being monitored when the aircraft carrying the scanning equipment is subjected to turbulence which results in pitch and/or yaw.

The first aspect of the present invention is thus the preferred form of the present invention, for it provides a compensation for that residual error, in a system where the basic constraints are (a) that the telescope, dispersing and condensing optics, and the detectors are rigidly attached to the aircraft, and (b) that the only part of the system to be moved to compensate for pitch and yaw is the scanning mirror.

Preferred embodiments of the two aspects of the present invention have been described above, by way of example only. Variations and modifications of these forms of the invention (some of which have been mentioned) are possible without departing from the present inventive concept.

INDUSTRIAL APPLICABILITY

The systems which have been described above were developed for use in an airborne multispectral scanner. Similar control of a small mirror can be used in any pointing application. By building a very light and compact system with powerful permanent magnets, the system response time for the first form of the present invention can be made very short, and by building a system with two crossed electromagnets, the pointing system can be steered for pointing lasers (for example, in graphics applications).

I claim:

1. A rotating mirror arrangement for use in airborne scanning comprising:
   a. A first shaft of circular cross section, adapted to rotate about its axis, said shaft being hollow at one end thereof to provide a cylindrical region of circular cross section with said shaft;
   b. a second shaft which is longer than the cylindrical region of the first shaft, said second shaft being supported within the cyindrical region of the first shaft by pivot means at or near the open end of said cylindrical region, said second shaft being pivotable about the axis of said pivot means, said axis being orthogonal to and passing through the axis of said first shaft, said second shaft being a loose fit in said cylindrical region;
   c. a planar mirror mounted on the end of said second shaft which is outside said cylindrical region, the plane of said mirror being at 45° relative to the axis of said second shaft;
   d. a first elongate permanent magnet mounted within said first shaft along the axis thereof, a pole of said first permanent magnet being adjacent to the closed end of said hollow cylindrical region;
   e. a second elongate permanent magnet mounted within said second shaft along the axis thereof, a pole of said second permanent magnet being adjacent to the end of said second shaft which is remote from said planar mirror so that said second permanent magnet is attracted by said first permanent magnet to bias the second shaft to a central position within the cylindrical region; and
   f. electromagnet means fixedly positioned external to said first shaft to generate a magnetic field in the region of said pole of said second permanent magnet.

2. A rotating mirror arrangement as defined in claim 1 in which said electromagnet means is a monopole electromagnet.

3. A rotating mirror arrangement as defined in claim 1 in which said electromagnet means is a dipole electromagnet.

4. A rotating mirror arrangement for use in airborne scanning comprising:
   a. A first shaft of circular cross section adapted to rotate about its axis, said shaft being hollow at one end thereof to provide a cylindrical region of circular cross section within said shaft;
   b. a second shaft which is longer than the cylindrical region of the first shaft, said second shaft being supported within the cylindrical region of the first shaft by a ball joint arrangement at or near the open end of said cylindrical region, said second shaft being pivotable about the axis of said ball joint arrangement, said axis being orthogonal to and passing through the axis of said first shaft, said second shaft being a loose fit in said cylindrical region;
   c. a planar mirror mounted on the end of said second shaft which is outside said cylindrical region, the plane of said mirror being at 45° relative to the axis of said second shaft;
   d. a first elongate permanent magnet mounted within said first shaft along the axis thereof, a pole of said first permanent magnet being adjacent to the closed end of said hollow cylindrical region;
   e. a second elongate permanent magnet mounted within said second shaft along the axis thereof, a pole of said second permanent magnet being adjacent to the end of said second shaft which is remote from said planar mirror, so that said second permanent magnet is attracted by said first permanent magnet, to bias the second shaft to a central position within the cylindrical region; and
   f. a quadrapole electromagnet fixedly positioned external to said first shaft, to generate a magnetic field which controls the position of said second permanent magnet relative to said first permanent magnet.

5. A rotating mirror arrangement as defined in claim 1 including means to balance said mirror and said second shaft both statically and dynamically.

6. A rotating mirror arrangement as defined in claim 5 in which said means to balance said mirror comprises a ring which is mounted with the plane of the ring orthogonal to the plane of said mirror, said ring being adapted to have small weights mounted thereon.

7. A rotating mirror arrangement as defined in claim 3 including balancing means to balance said mirror, said balancing means comprising a ring which is mounted with the plane of the ring orthogonal to the plane of said mirror, said ring being adapted to have small weights mounted thereon.

8. A rotating mirror arrangement as defined in claim 4, including balancing means to balance said mirror, said balancing means comprising a ring which is mounted with the plane of the ring orthogonal to the plane of said mirror, said ring being adapted to have small weights mounted thereon.

9. A rotating mirror arrangement as defined in claim 1, including:
   a. a gyroscope system adapted to be mounted in an aircraft, said gyroscope system producing signals which are indicative of aircraft roll, pitch and yaw;
   b. means responsive to the pitch and yaw signals generated by said gyroscope system to control the current through windings of said electromagnet means; and
   c. means responsive to the roll signal generated by said gyroscope system to control the onset of sampling of radiation reflected by said mirror.

10. A rotating mirror arrangement as defined in claim 9, wherein said means responsive to the roll signal comprises a microprocessor and said means responsive to the pitch and roll signals comprises a first amplifier adapted to receive the pitch signal and a second amplifier adapted to receive the yaw signal, said amplifiers being connected to respective current sources for the windings of said electromagnet means.

11. A rotating mirror arrangement as defined in claim 4 including:
   a. a gyroscope system adapted to be mounted in an aircraft, said gyroscope system producing signals which are indicative of aircraft roll, pitch and yaw;
   b. means responsive to the pitch and yaw signals generated by said gyroscope system to control the current through windings of said electromagnet; and
   c. means responsive to the roll signal generated by said gyroscope system to control the onset of sampling of radiation reflected by said mirror.

12. A rotating mirror arrangement as defined in claim 11 wherein said means responsive to the roll signal comprises a microprocessor and said means responsive to the pitch and roll signals comprises a first amplifier adapted to receive the pitch signal and a second amplifier adapted to receive the yaw signal, said amplifiers being connected to respective current sources for the windings of said electromagnet.

13. A rotating mirror arrangement as defined in claim 10 wherein said electromagnet means is a dipole electromagnet.

* * * * *